United States Patent [19]

Gruden et al.

[11] 4,258,681

[45] Mar. 31, 1981

[54] FUEL SYSTEM FOR A MIXTURE-COMPRESSING, SPARK IGNITED FOUR CYCLE INTERNAL COMBUSTION ENGINE WITH CHARGE STRATIFICATION

[75] Inventors: Dusan Gruden, Ditzingen; Uwe Markovac, Ludwigsburg, both of Fed. Rep. of Germany

[73] Assignee: Dr. Ing. h.c.F. Porsche Aktiengesellschaft, Fed. Rep. of Germany

[21] Appl. No.: 954,122

[22] Filed: Oct. 24, 1978

[30] Foreign Application Priority Data

Nov. 26, 1977 [DE] Fed. Rep. of Germany ....... 2752885

[51] Int. Cl.³ ............................................ F22B 21/30
[52] U.S. Cl. ................................... 123/277; 123/511; 123/514
[58] Field of Search ........... 123/32 ST, 32 SP, 191 S, 123/136, 139 AV, 191 SP, 75 B

[56] References Cited

U.S. PATENT DOCUMENTS

| | | | |
|---|---|---|---|
| 2,534,346 | 12/1950 | Fenney | 123/32 ST |
| 3,039,485 | 6/1962 | Brohl | 123/136 |
| 3,682,146 | 8/1972 | Mozokhim et al. | 123/32 ST |
| 3,805,823 | 4/1974 | Kakegawa | 137/489 |
| 3,824,965 | 7/1974 | Clawson | 123/32 ST |
| 3,990,413 | 11/1976 | Pischinger | 123/32 ST |
| 4,044,746 | 8/1977 | Kaye | 123/136 |
| 4,119,066 | 10/1978 | Happel | 123/32 ST |

FOREIGN PATENT DOCUMENTS 2307017 8/1973 Fed. Rep. of Germany ...... 123/32 ST

Primary Examiner—Charles J. Myhre
Assistant Examiner—Andrew M. Dolinar
Attorney, Agent, or Firm—Craig and Antonelli

[57] ABSTRACT

A fuel system for a mixture-compressing, spark-ignited four cycle internal combustion engine with charge stratification of the type wherein a major portion of the charge is introduced into a main combustion chamber as a lean fuel-air mixture by a main mixture forming system such as a carburetor and wherein the remainder of the charge is introduced into an auxiliary combustion chamber joined to the main combustion chamber via a firing channel by an auxiliary combustion chamber injection pump and injection nozzle is improved by the provision of only a single fuel feed pump which is connected to the fuel tank and supplies fuel from the tank directly to the injection pump at a first pressure and supplies fuel to the main mixture forming system via a pressure reducing valve at a second pressure that is lower than the first pressure. According to a preferred embodiment, the single fuel feed pump supplies fuel to the injection pump at a pressure of 1 bar and the pressure-reducing valve is a pilot valve that reduces the pressure of fuel supplied to it to 0.2 bar.

3 Claims, 1 Drawing Figure

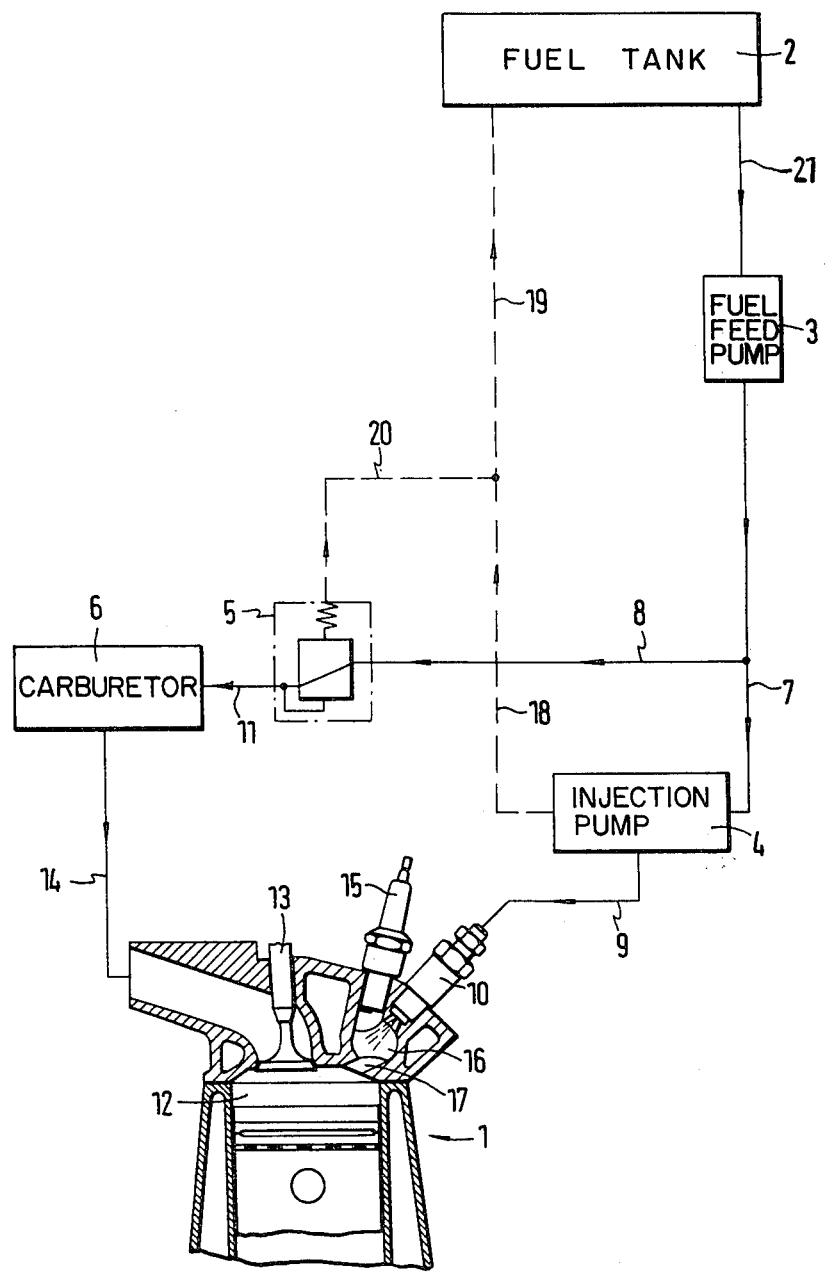

FUEL SYSTEM FOR A MIXTURE-COMPRESSING, SPARK IGNITED FOUR CYCLE INTERNAL COMBUSTION ENGINE WITH CHARGE STRATIFICATION

BACKGROUND AND SUMMARY OF THE INVENTION

The invention relates to a fuel supply system for a mixture-compressing, spark-ignited four cycle internal combustion engine with charge stratification wherein the largest part of the charge is introduced into a main combustion chamber as a lean fuel-air mixture through at least one inlet valve by a main mixture-forming system, for example, a carburetor, and the fuel of the residual portion of the charge, constituted by a fuel-enriched fuel-air mixture, is introduced directly into an auxiliary combustion chamber joined to the main combustion chamber by way of a firing channel with the aid of an auxiliary combustion chamber injection pump by way of an injection nozzle; and wherein the fuel supply system comprises a fuel tank.

In a conventional fuel supply system for a mixture-compressing, spark-ignited four cycle internal combustion engine with charge stratification of the above-mentioned type, a fuel feed pump is provided for the fuel of the lean fuel-air mixture fed to the main combustion chamber via a carburetor, and a fuel feed pump is provided for the fuel of the rich fuel-air mixture fed via an injection pump into the auxiliary combustion chamber. These two fuel feed pumps are necessary, because the injection pump requires a fuel feed pressure of about 1 bar, and the carburetor requires merely a fuel feed pressure of about 0.2 bar. The expenses involved in manufacturing such a fuel supply system are relatively high due to the necessity of providing two fuel pumps.

It is an object of the invention to provide a fuel supply system for an internal combustion engine of the type mentioned hereinabove, which involves less expenses than required for the conventional fuel supply system.

According to the invention, this object is attained by a preferred embodiment in that the fuel supply system has a single fuel feed pump, by means of which the fuel is conveyed from the fuel tank directly to the auxiliary combustion chamber injection pump and to the carburetor via a pressure reducing valve. Thereby, a fuel supply system has been created for internal combustion engines with charge stratification which exhibits, in addition to the lower capital outlay, also a higher functional safety than the conventional fuel supply system since a pressure reducing valve, due to the fact that its structure is simple and its operation reliable, has a lower susceptibility to disturbances than an electric fuel feed pump.

These and further objects, features and advantages of the present invention will become more obvious from the following description when taken in connection with the accompanying drawing which shows, for purposes of illustration only, a single embodiment in accordance with the present invention.

BRIEF DESCRIPTION OF THE DRAWINGS

The drawing shows a schematic view of the invention.

DETAILED DESCRIPTION OF THE PREFERRED EMBODIMENT

The fuel supply system for a mixture-compressing, spark-ignited four cycle internal combustion engine, denoted generally by the numeral 1, operates with charge stratification and comprises a fuel tank 2, a fuel feed pump 3, an auxiliary combustion chamber injection pump 4, a pressure reducing valve 5, and a main mixture-forming system, for example, a carburetor 6. A fuel line leading from the fuel tank 2 to the fuel feed pump 3 is denoted by 21; the fuel line leading from the fuel feed pump 3 to the injection pump 4 for the auxiliary combustion chamber is denoted by 7, and the fuel line leading from the fuel feed pump 3 to the pressure reducing valve 5 is denoted by 8. The fuel is conveyed by the injection pump 4 through a fuel line 9 to an injection valve 10 and by the pressure reducing valve 5 through a fuel line 11 to the carburetor 6. The internal combustion engine 1 comprises a main combustion chamber 12 to which is fed the largest part of the charge via an inlet valve 13 in the form of a lean fuel-air mixture from the carburetor 6 via a mixture line 14, and further comprises an auxiliary combustion chamber 16 exhibiting the spark plug 15; the fuel of the residual part of the charge, formed by rich fuel-air mixture, is fed to this auxiliary combustion chamber, and the latter is in communication with the main combustion chamber 12 via a firing channel 17. The injection pump 4 of the auxiliary combustion chamber is connected to the fuel tank 2 by fuel return lines 18 and 19, and the pressure reducing valve 5 is connected to the fuel tank 2 by a fuel return line 20 and the fuel return line 19.

The device of this invention functions as follows:

Fuel is conveyed by the fuel feed pump 3 from the fuel tank 2 via the fuel feed lines 21 and 7 to the injection pump 4 of the auxiliary combustion chamber and via the fuel feed lines 21 and 8 to the high-pressure side of the pressure reducing valve 5 under a fuel feed pressure of about 1 bar. The injection pump 4 of the auxiliary combustion chamber requires this pressure to be able to convey the fuel via the injection nozzle 10 to the auxiliary combustion chamber 16. The pressure reducing valve 5, which is conventional and is in the present case a pilot-type pressure reducing valve, controls the pressure of about 1 bar applied to the high-pressure side of the pressure reducing valve so that a pressure of about 0.2 bar is produced on the low-pressure side of the pressure reducing valve. This fuel feed pressure is required by the carburetor 6 for it to be able to convey the fuel-air mixture to the main combustion chamber 12.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A fuel system for a mixture-compressing, spark-ignited four cycle internal combustion engine with charge stratification of the type wherein the largest portion of the charge is introduced into a main combustion chamber as a lean fuel-air mixture through at least one inlet valve by a main mixture forming system comprising a carburetor, and wherein the remainder of the charge is introduced into an auxiliary combustion chamber joined to said main combustion dhamber via a firing channel by an auxiliary combustion chamber injection pump and injection nozzle, the improvement comprising:
- a fuel tank,
- a single fuel feed pump connected to said fuel tank
- means for supplying fuel from said fuel feed pump directly to said injection pump,
- a pilot type pressure reducing valve, and
- means for supplying fuel from said fuel feed pump to said main mixture forming system via said pressure reducing valve, whereby said single fuel feed pump is able to supply fuel to said injection pump at a first pressure and said main mixture forming system at a second pressure that is lower than said first pressure.

2. A fuel system according to claim 1, wherein said first pressure is 1 bar and said second pressure is 0.2 bar.

3. A fuel system according to claim 1, wherein said means for supplying comprises a first fuel line for supplying fuel at said first pressure from said fuel feed pump to said pilot-type pressure reducing valve and a second fuel line for transferring the fuel fed to said pilot-type pressure reducing valve to said carburetor at said second pressure.

* * * * *